(12) United States Patent
Nabuurs et al.

(10) Patent No.: US 6,257,658 B1
(45) Date of Patent: *Jul. 10, 2001

(54) OPEN ROOF CONSTRUCTION FOR A VEHICLE

(75) Inventors: Martinus Wilhelmus Maria Nabuurs, Overloon; Petrus Gerardus Marie Reivers, Arcen; Egbert Boersma, Helmond, all of (NL)

(73) Assignee: Inalfa Industries B.V., Venray (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/140,496

(22) Filed: Aug. 27, 1998

(30) Foreign Application Priority Data

Aug. 28, 1997 (NL) .................................... 1006867

(51) Int. Cl.$^7$ ............................................. B60J 7/00
(52) U.S. Cl. ................................................ 296/223
(58) Field of Search ................................... 296/223

(56) References Cited

U.S. PATENT DOCUMENTS

| | | | |
|---|---|---|---|
| 4,630,859 | * 12/1986 | Bienert et al. | 296/217 |
| 4,647,106 | * 3/1987 | Furst | 296/223 |
| 5,066,068 | * 11/1991 | Suzuki et al. | 296/221 |
| 5,154,482 | * 10/1992 | Hayashi et al. | 296/223 |
| 5,593,204 | * 1/1997 | Wahl et al. | 296/223 |

FOREIGN PATENT DOCUMENTS

| | | | |
|---|---|---|---|
| 3920372 | * 8/1990 | (DE) | 296/223 |
| 91 16 421 U | 11/1992 | (DE) . | |
| 9116421 | * 12/1992 | (DE) . | |
| 44 05 742 C1 | 5/1995 | (DE) . | |
| 0 747 249 A1 | 12/1996 | (EP) . | |
| 403025026 | * 2/1991 | (JP) | 296/223 |

* cited by examiner

Primary Examiner—Dennis H. Pedder
(74) Attorney, Agent, or Firm—Westman, Champlin & Kelly, P.A.

(57) ABSTRACT

An open roof construction for a vehicle having an opening in its fixed roof comprises a panel for selectively closing or at least partially releasing the roof opening. An operating mechanism comprises a link formed of a metal plate or the like, which is connected to said closing element and which is fixed at the location of points of attachment. The link is provided with a slot for guiding a pin or the like, which slot is defined by plastic material on at least one side (upper side or underside), which plastic material is at least partially enclosed by metal plate on two sides (left side/right side). The link is formed of a single metal plate, at least at the location of said points of attachment.

The plastic material of the link slot may consist of a rubbery base layer and of a sliding layer having a low coefficient of friction.

13 Claims, 3 Drawing Sheets

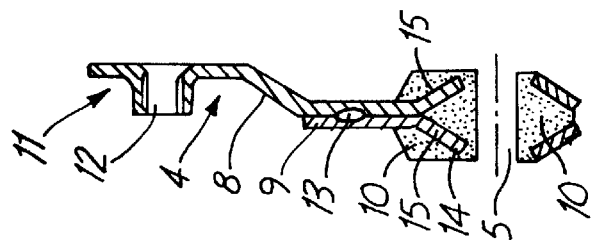
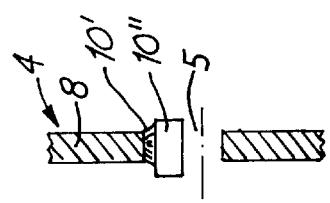
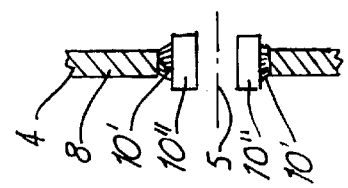
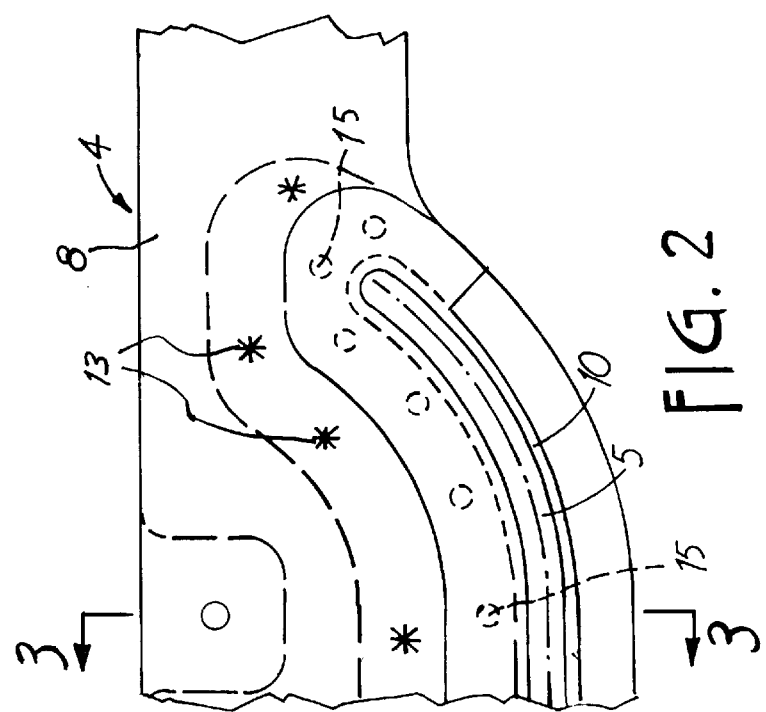

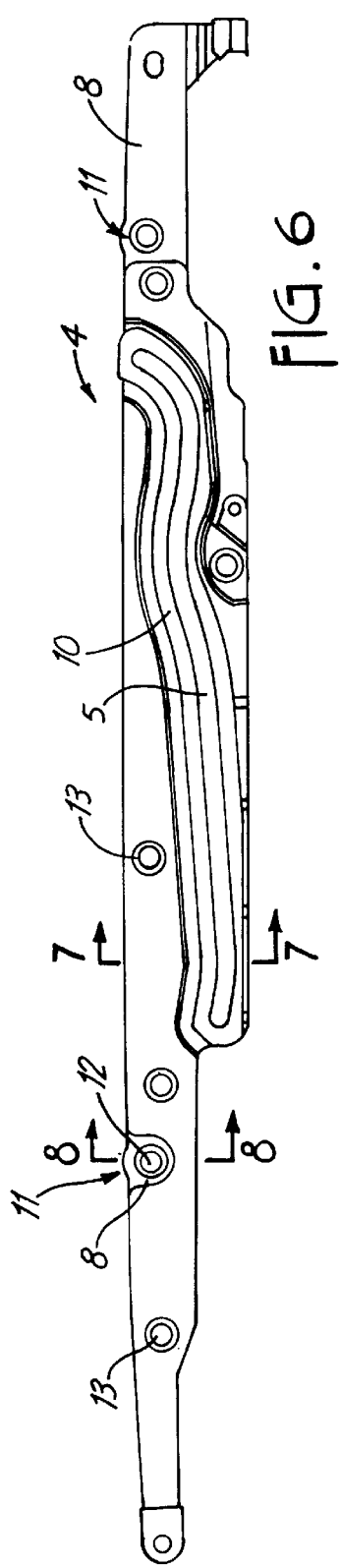

OPEN ROOF CONSTRUCTION FOR A VEHICLE

BACKGROUND OF THE INVENTION

1. Field of the Invention

The present invention relates to an open roof construction for a vehicle having an opening in its fixed roof, which construction comprises a closing element, in particular a panel, for selectively closing or at least partially releasing the roof opening, operating mechanism comprising a link formed of a metal plate or the like, is connected to said closing element and is fixed at the location of points of attachment. The link is provided with a slot for guiding a pin or the like, which slot is defined by plastic material on at least one side.

2. Description of the Related Art

An open roof construction of this kind is for example known from DE-U-91 16 421.4, DE-C-44 05 742 and from EP-A-0 747 249.

SUMMARY OF THE INVENTION

The object of the present invention is to further improve such known open roof constructions.

To this end, a first embodiment of the open roof construction according to the invention, wherein said plastic material is present on two sides, at least partially between metal plates, is characterized in that said link is formed of a single metal plate, at least at the location of said points of attachment.

The advantage of this construction according to the invention is on the one hand the presence of a sandwich construction at said slot, whereby the plastic material is firmly enclosed between the metal plate portions, whilst only a single metal plate or the like is present at the location of the points of attachment, so that problems caused by the presence of plastic material or a second metal plate are avoided there. This makes it possible to select the design such that the metal and the plastic material will only be present in those places where this is advantageous from a constructional point of view. Thus, the link may in substance only be formed of a double metal plate at the location of said slot. This will minimize the use of material.

In the case that two separate metal plates are provided, it is advantageous when the plate, which is used for the attachment, in particular to the closing element, is thicker than the other plate, which is used for accommodating or confining the plastic material. In this way, the metal plates can be optimized on the basis of their respective functions.

In one embodiment, wherein the plastic material has been formed on the metal plate by means of an injection molding technique, a further improvement is the fact that a lip portion of the metal plate is encased, adjacent to said link slot, at least partially with plastic material, and is for example provided with recesses or the like to allow the plastic material to pass during said injection molding.

Thus, at least parts of the metal plate adjacent to the link slot are embedded in said plastic material, so that the plastic material and the metal plate are anchored extra securely with respect to each other. Said recesses may consist of discrete openings provided near said link slot or of notches, which extend from the slot which is formed in the metal plate before the link slot, thus forming projections which extend into the plastic material.

According to yet another improvement of the invention, the plastic material of the slot is at least partially formed of a rubber elastic base layer and a surface having a low coefficient of friction. The surface may consist of a separate material, such as Teflon, or be smoothed by means of a surface treatment or the like of the rubber elastic material. It is possible to form only one side of the slot in this manner.

The advantage of this embodiment is the fact that it is possible to select negative tolerances for the link slot, so that there will be no rattling of the pin in the link slot, not even after a prolonged period of time. The surface having the low coefficient of friction thereby ensures that there will not be any excessive resistance against movement of the pin in the link in the case that negative tolerances are used.

The invention will be explained in more detail hereafter with reference to the drawings, which are highly schematic views of an embodiment of the open roof construction according to the invention.

BRIEF DESCRIPTION OF THE DRAWINGS

FIG. 2 is a larger-scale side view of a part of a link of the open roof construction of FIG. 1.

FIG. 3 is a sectional view along line III—III in FIG. 2.

FIG. 4 is a sectional view, which corresponds with FIG. 3, of a second embodiment of the open roof construction according to the invention.

FIG. 5 is a sectional view, which corresponds with FIG. 4, of another embodiment.

FIG. 6 is a side view of a link of a third embodiment of the open roof construction according to the invention.

FIGS. 7 and 8 are enlarged sectional views along the lines VII—VII and VIII—VIII of FIG. 6, respectively.

DESCRIPTION OF THE PREFERRED EMBODIMENTS

Figure 1:
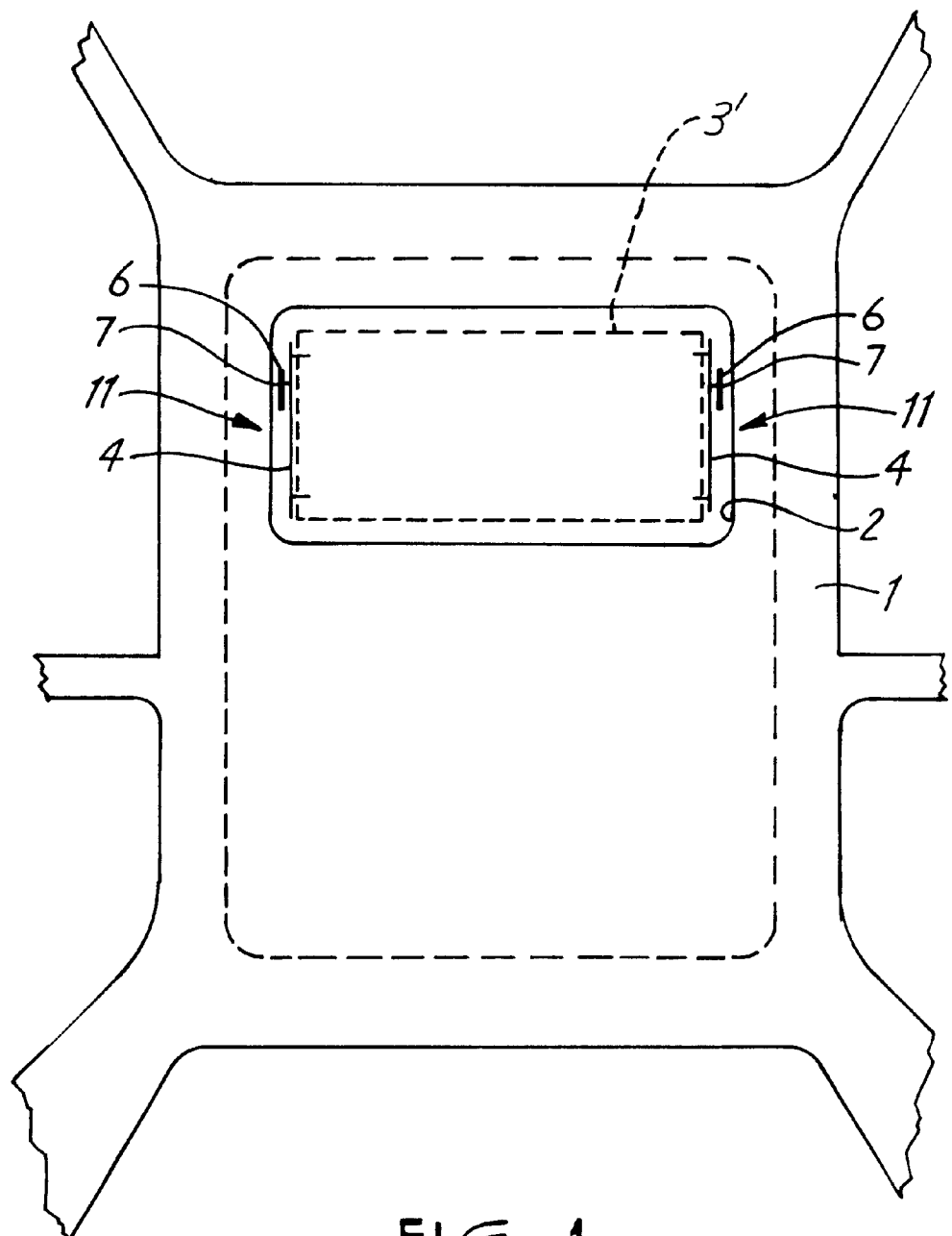
FIG. 1 is a highly schematic plan view of a vehicle roof with an open roof construction according to the invention present therein.

The drawing, and in first instance FIG. 1, shows a fixed roof 1 of a vehicle, such as a passenger car, which is provided with a roof opening 2 for an open roof construction. The open roof construction comprises a closing element 3 for selectively closing or at least partially opening the roof opening 2. In this embodiment, the closing element 3 is a rigid panel, in particular a transparent panel made of glass or of plastic material, but also other closing elements such as slatted elements or a flexible cover are conceivable. Formed on the underside of panel 3 is a stiffening frame 3' or the like, whilst links 4 comprising a link slot 5, which function to connect the panel to an operating mechanism 6, are attached to the sides thereof that extend in the longitudinal direction of the vehicle. Parts of said operating mechanism 6 are movable in the longitudinal direction of the vehicle, in longitudinal guides (not shown) which are attached to the frame of the open roof construction or directly to the roof of the vehicle. Said operating mechanism 6 is provided with at least one horizontal pin 7, which projects into the link slot 5 having a predetermined shape, and which determines the movement of panel 3 by moving through said link slot 5. The illustrated open roof construction is a tilting-sliding roof, but other types of movement are also possible.

As is shown in FIGS. 2 and 3, link 4 comprises a fastening plate 8 formed of a metal, such as steel, or of another high-strength material, an auxiliary plate 9 of metal or the like, and a plastic part 10, which functions to define link slot 5. Fastening plate 8 gives the link 4 its strength, and it is sufficiently thick for taking up the forces that act on link 4. Fastening plate 8 has been formed by means of a cutting operation or the like, and it comprises a point of attachment 11 formed with a hole 12 for passing a fastening element (not shown) for attaching link 4 to the stiffening frame of panel 3. Link 4 comprises a number of points of attachment 11. Auxiliary plate 9 is attached to fastening plate 8, substantially in an area surrounding link slot 5, by spot welding or rivetting, as is schematically indicated at 13. Fastening plate 8 and auxiliary plate 9 are both formed with a slot 14, which is slightly larger than link slot 5. Fastening plate 8 and auxiliary plate 9 are furthermore bent in directions away from each other in the region surrounding link slot 5 and inwardly of connecting places 13, so that the slots 14 in plates 8 and 9 are spaced horizontally apart. This makes it possible to provide plastic material between plates 8 and 9 in an area surrounding slots 14, and also within slots 14, thus forming link slot 5, which has a height which is slightly smaller than that of slots 14.

The plastic of plastic part 10 is preferably formed on metal plates 8 and 9 by means of an injection molding technique, whereby the injection mold determines the height of link slot 5 and the boundary lines of plastic part 10. The drawing, in particular FIG. 3, shows that holes 15 are formed in the outwardly bent parts of plates 8 and 9, at a small distance from slots 14, whilst the plastic material is present on either side of plates 8 and 9 at that location, with the plastic material on one side being in one piece with the plastic on the other side via said holes 15. The height of the plastic part 10 may be relatively small thereby, so that only a small volume of plastic material will suffice. Also the metal of plates 8 and 9 is used efficiently, whereby the thickness of auxiliary plate 9, which only functions to receive plastic part 10, is preferably smaller than the thickness of fastening plate 8, which effects the connection with the closing element 3. Instead of using two separate plates, it would also be possible to use one plate, certainly in the cases that the two plates are equally thick, which plate is bent over and which also continues under plastic part 10.

FIG. 4 shows a second embodiment of the invention, whereby the plastic part 10 is built up of a rubber elastic base layer 10' and a thin, smooth top layer 10" having a low coefficient of friction. The base layer may be made of EPDM or PU, for example, while top layer 10" may, for example, consist of Teflon. The base layer may also have a smooth surface, however. This construction of the plastic part 10 makes it possible to use negative tolerances for the combination of pin 7 and link slot 7, so that pin 5 can be accommodated in link slot 5 with a certain bias, thus ensuring a rattle-free operation of the pin-slot connection, free from play, for a prolonged period of time. Furthermore, the plastic part 10 will have a vibration isolating effect. The thicknesses of the two layers 10' and 10" can be selected independently of the design. In the illustrated embodiment, link 4 consists of only one fastening plate 8, with no auxiliary plate 9 being provided, but the construction of plastic part 10 can be used in the embodiment according to FIGS. 2 and 3 without any problem.

FIG. 5 shows another variant of the embodiment of FIG. 4, wherein the plastic material of plastic part 10 is only provided on one side (the upper side) of link slot 5, since link 4 is supported by pin 7 on the upper side. Consequently, it is essential that plastic material be provided on that side. If in another embodiment the forces are exerted and/or distributed in a different manner, plastic material may be provided only on the bottom side of link slot 5, of course.

FIGS. 6, 7 and 8 show yet a further practical embodiment of the invention. Distinguishable are the link 4, which is formed of a thicker fastening plate 8 extending the whole area of the link, an auxiliary plate 9 extending through a portion of said area and being attached thereto at locations 13, and plastic material 10 arranged between the plates 8 and 9 for defining a link slot 5.

As is shown in FIG. 7, in order to attach the plastic material 10 to the plates 8 and 9, the plates 8 and 9 are bent away from each other in an area around the slot 5 so that the plastic material may be accomodated between the plates. The plastic is preferably provided by injection molding again. The mold is constructed such that room is available outwardly of the plates 8 and 9 so that lip portion of the plates are encased by the plastic material 10 adjacent the link slot 5. To further improve the confinement of the plastic material between the plates 8 and 9, the fastening plate 8 is provided at the location of the bend with a continuous longitudinal notch 16, into which the plastic material may penetrate to hold it in vertical direction.

FIG. 8 shows one of the points of attachments 11 having a screw hole 12 to fasten the link 4 to the closing element 3. Also in this embodiment only the fastening plate 8 is present at the point of attachment.

We claim:

1. An open roof construction for a vehicle having an opening in a fixed roof, comprising:

a closing element for selectively closing and at least partially opening the roof opening;

an operating mechanism comprising a link formed of a plurality of metal plate portions which link is coupleable to said closing element at points of attachment, said link being provided with a slot for guiding a pin, said slot having upper and lower sides and having plastic material on at least one of the upper and lower sides, said plastic material being at least partially bounded by the plurality of metal plate portions; and wherein said link is formed of one of said metal plate portions at least at the location of said points of attachment, the other of said metal plate portions terminating at a distance from said points of attachment.

2. The open roof construction according to claim 1, wherein said link comprises two metal plate portions joined together proximate the location of said link slot.

3. The open roof construction according to claim 1, wherein said link comprises two separate metal plate portions joined together, whereby the metal plate portion which is couplable to said closing element, is thicker than the other plate portion.

4. The open roof construction according to claim 1, wherein said link comprises two separate metal plate portions joined together in places where no plastic material is present between the metal plate portions.

5. The open roof construction according to claim 4, wherein at least one of the metal plate portions proximate the slot is bent to extend away from the other plate portion to receive plastic material therebetween.

6. The open roof construction according to claim 1, wherein a lip portion of at least one metal plate portion is at least partially encased by plastic material adjacent the link slot.

7. The open roof construction according to claim 6, wherein at least one metal plate portion is provided, adjacent to said link slot, with at least one aperture through which plastic material extends.

8. The open roof construction according to claim 1, wherein at least one metal plate portion is provided on its side facing the plastic material with a notch to receive plastic material to form a fixing member.

9. The open roof construction according to claim 1, wherein the plastic material of the slot is at least partially formed of a rubber elastic base layer and a surface having a low coefficient of friction.

10. The open roof construction of claim 1, wherein said slot includes upper and lower sides and includes said plastic material disposed on substantially all of at least one of the upper and lower sides, and wherein the plastic material of the slot is at least partially formed of a rubber elastic base layer and a surface having a low coefficient of friction.

11. The open roof construction according to claim 10, wherein said plastic material is provided within one metal plate.

12. An open roof construction for a vehicle having an opening in a fixed roof, comprising:

- a closing element for selectively closing and at least partially opening the roof opening;
- an operating mechanism comprising a link formed of a plurality of metal plate portions which link is coupleable to said closing element at points of attachment, said link being provided with a slot for guiding a pin, said slot being defined by plastic material on at least one side, said plastic material being at least partially bounded by the plurality of metal plate portions on two sides;
- wherein said link is formed of a single metal plate portion at least at the location of said points of attachment, and comprises two separate metal plate portions joined together in places where no plastic material is present between the metal plate portions; and
- wherein at least one of the metal plate portions proximate the slot is bent to extend away from the other plate portion to receive plastic material therebetween.

13. The open roof construction of claim 12, wherein the link comprises:

- a lip portion deflected away from the metal plate portion; and
- said plastic material surrounding an outer periphery of the lip portion.

* * * * *

UNITED STATES PATENT AND TRADEMARK OFFICE
CERTIFICATE OF CORRECTION

| | |
|---|---|
| PATENT NO. | : 6,257,658 B1 |
| DATED | : July 10, 2001 |
| INVENTOR(S) | : Nabuurs |

Page 1 of 1

It is certified that error appears in the above-identified patent and that said Letters Patent is hereby corrected as shown below:

<u>Column 1,</u>
Line 10, replace "," with -- . An --.

<u>Column 3,</u>
Line 46, replace "slot 7" with -- slot 5 --.
Line 46, replace "pin 5" with -- pin 7 --.

<u>Column 4,</u>
Line 11, replace "portion" with -- portions --.

Signed and Sealed this

Ninth Day of April, 2002

*Attest:*

*Attesting Officer*

JAMES E. ROGAN
*Director of the United States Patent and Trademark Office*